(12) United States Patent
Lee et al.

(10) Patent No.: US 9,755,813 B2
(45) Date of Patent: Sep. 5, 2017

(54) METHOD AND APPARATUS FOR CONTROLLING DEACTIVATION TIMER OF CELL INCLUDED IN TAG

(71) Applicant: LG ELECTRONICS INC., Seoul (KR)

(72) Inventors: Sun Young Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 14/384,821

(22) PCT Filed: Mar. 14, 2013

(86) PCT No.: PCT/KR2013/002069
§ 371 (c)(1),
(2) Date: Sep. 12, 2014

(87) PCT Pub. No.: WO2013/137667
PCT Pub. Date: Sep. 19, 2013

(65) Prior Publication Data
US 2015/0036614 A1 Feb. 5, 2015

Related U.S. Application Data

(60) Provisional application No. 61/611,551, filed on Mar. 15, 2012.

(51) Int. Cl.
*H04W 74/08* (2009.01)
*H04L 5/00* (2006.01)
(Continued)

(52) U.S. Cl.
CPC .......... *H04L 5/0078* (2013.01); *H04L 5/0032* (2013.01); *H04W 56/0045* (2013.01);
(Continued)

(58) Field of Classification Search
None
See application file for complete search history.

(56) References Cited

U.S. PATENT DOCUMENTS

2011/0103332 A1 5/2011 Kuo
2011/0243048 A1* 10/2011 Wang ................... H04L 5/0051
370/311
(Continued)

OTHER PUBLICATIONS

CATT: "Deactivation Timer Handling for Timing Reference Cell", 3GPP TSG RAN WG2 Meeting #77, R2-120253, Feb. 6-10, 2012.
(Continued)

*Primary Examiner* — Anh-Vu Ly
*Assistant Examiner* — Hector Reyes Ortiz
(74) *Attorney, Agent, or Firm* — Dentons US LLP (57) ABSTRACT

The present specification proposes a scheme for controlling a deactivation timer of a cell. More specifically, the present specification proposes a method of controlling a deactivation timer of a cell in a mobile communication system. The method includes: configuring, at a user equipment (UE), a first deactivation timer of a first cell and a second deactivation timer of a second cell, wherein the first cell and the second cell belong to a same timing advance group (TAG); if the first deactivation timer of first cell expires, checking, at the UE, whether uplink timing of the same TAG is required to be maintained; and if the uplink timing of the same TAG is required to be maintained, restarting, at the UE, the first deactivation timer of the first cell.

9 Claims, 11 Drawing Sheets (51) Int. Cl.
 H04W 56/00 (2009.01)
 H04W 72/02 (2009.01)
 H04W 72/04 (2009.01)
(52) U.S. Cl.
 CPC ....... *H04W 72/02* (2013.01); *H04W 72/0446* (2013.01); *H04W 74/0833* (2013.01)

(56) References Cited

U.S. PATENT DOCUMENTS

| | | | |
|---|---|---|---|
| 2011/0243102 A1 | 10/2011 | Sebire et al. | |
| 2011/0243106 A1* | 10/2011 | Hsu | H04L 5/0096 370/336 |
| 2011/0249635 A1 | 10/2011 | Chen et al. | |
| 2013/0114398 A1* | 5/2013 | Wang | H04W 76/048 370/221 |
| 2013/0114574 A1* | 5/2013 | Ng | H04W 56/0045 370/336 |
| 2014/0092812 A1* | 4/2014 | Jang | H04W 56/0045 370/328 |

OTHER PUBLICATIONS

Nokia: "Timing Reference for sTAG", 3GPP TSG-RAN WG2 Meeting #77, R2-120086, Feb. 6-10, 2012.

3GPP TS 36.321 V10.5.0 (Mar. 2012), 3rd Generation Partnership Project; Technical Specification Group Radio Access Network; Evolved Universal Terrestrial Radio Access (E-UTRA); Medium Access Control (MAC) protocol specification (Release 10).

CATT, "Consideration on TA Group" R2-112814, 3GPP TSG RAN WG2 Meeting #74, Barcelona, Spain, May 9-13, 2011 See p. 1, lines 15-17; and p. 2, lines 10-11.

LG Electronics, "Simultaneous transmissions in multiple TA groups", R1-110424, 3Gpp TSG RAN WG1 #68, Dresden, Germany, Feb. 6-10, 2012 See p. 1, lines 6-7; p. 1, line 11; and p. 2, lines 18-19.

\* cited by examiner

| $C_7$ | $C_6$ | $C_5$ | $C_4$ | $C_3$ | $C_2$ | $C_1$ | R | Oct 1

METHOD AND APPARATUS FOR CONTROLLING DEACTIVATION TIMER OF CELL INCLUDED IN TAG

This application is a 35 USC §371 National Stage entry of International Application No. PCT/KR2013/002069, filed Mar. 14, 2013, which claims priority to U.S. Provisional No. 61/611,551, filed on Mar. 15, 2012, each of which are hereby incorporated by reference in their entirety for all purposes as if fully set forth herein.

BACKGROUND OF THE INVENTION

Field of the Invention

The present invention relates to a scheme for controlling a deactivation timer included in a cell, and more particularly, to a method and apparatus for restarting a deactivation timer of at least any one cell among cells included in the same timing advance group (TAG).

Related Art

One of requirements of a wireless communication system is to support a high data rate. For this, various techniques such as multiple input multiple output (MIMO), cooperative multiple point transmission (CoMP), relay, carrier aggregation, etc., have been under research.

In concept, the carrier aggregation (CA) aggregates a plurality of bands into one system. In this case, a band that can be independently operated may be called a component carrier (CC). The plurality of carriers may correspond to a plurality of cells. The cell may be managed by being divided into various types of cells such as a primary cell and a secondary cell.

SUMMARY OF THE INVENTION

The present specification proposes to improve a scheme for controlling a deactivation timer of a cell. More specifically, it is proposed a scheme for maintaining an activation state of a specific cell in a specific timing advance group (TAG) in a carrier aggregation (CA) technology of a long term evolution (LTE) system which uses multiple uplink timing advances. The specific TAG may be a TAG consisting of only a secondary cell (i.e., sTAG). In addition, the specific cell may be a timing reference cell included in the sTAG.

The present specification proposes scheme for controlling a deactivation timer of a cell. In detail, the present specification proposes a method of controlling a deactivation timer of a cell in a mobile communication system. The method comprises: configuring, at a user equipment (UE), a first deactivation timer of a first cell and a second deactivation timer of a second cell, wherein the first cell and the second cell belong to a same timing advance group (TAG); if the first deactivation timer of first cell expires, checking, at the UE, whether uplink timing of the same TAG is required to be maintained; and if the uplink timing of the same TAG is required to be maintained, restarting, at the UE, the first deactivation timer of the first cell Additionally or alternatively, the step of checking whether the uplink timing of the same TAG is required to be maintained comprises: checking whether the second deactivation timer of the second cell is running.

Additionally or alternatively, the first deactivation timer of the first cell is restarted if the second deactivation timer of the second cell is running when the first deactivation timer of first cell expires.

Additionally or alternatively, the UE further configures a primary cell.

Additionally or alternatively, the first cell and the second cell are secondary cells, wherein the same TAG is a secondary TAG.

Additionally or alternatively, the first cell is a timing reference cell of the same TAG.

Additionally or alternatively, the timing reference cell is a cell for which random access channel (RACH) configuration is provided by a base station.

Additionally or alternatively, the timing reference cell is a cell on which random access procedure is successfully completed.

Additionally or alternatively, a timer value indicating time duration during which a deactivation timer of a secondary cell is running is commonly applied to the first deactivation timer of the first cell and the second deactivation timer of the second cell.

Additionally or alternatively, the method further comprises, if the uplink timing of the same TAG is not required to be maintained, deactivating the first cell.

Also, the present specification proposes a user equipment (UE) for controlling a deactivation timer of a cell in a mobile communication system. In detail, the UE comprises a transceiver configured to receive and/or transmit a signal; and a processor coupled to the transceiver and configured to: configure a first deactivation timer of a first cell and a second deactivation timer of a second cell, wherein the first cell and the second cell belong to a same timing advance group (TAG); if the first deactivation timer of first cell expires, check whether uplink timing of the same TAG is required to be maintained; and if the uplink timing of the same TAG is required to be maintained, restart the first deactivation timer of the first cell.

DESCRIPTION OF EXEMPLARY EMBODIMENTS

The present document provides a transmission method and apparatus for controlling a timer in a wireless communication system, in particular, a wireless communication system supporting a carrier aggregation (CA). For clarity, the following description is based on $3^{rd}$ generation partnership project (3GPP) long term evolution (LTE) supporting the CA and an evolution thereof, but the present invention is not limited thereto.

LTE of the 3GPP standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advanced (LTE-A) is an evolution of the LTE.

Figure 1:
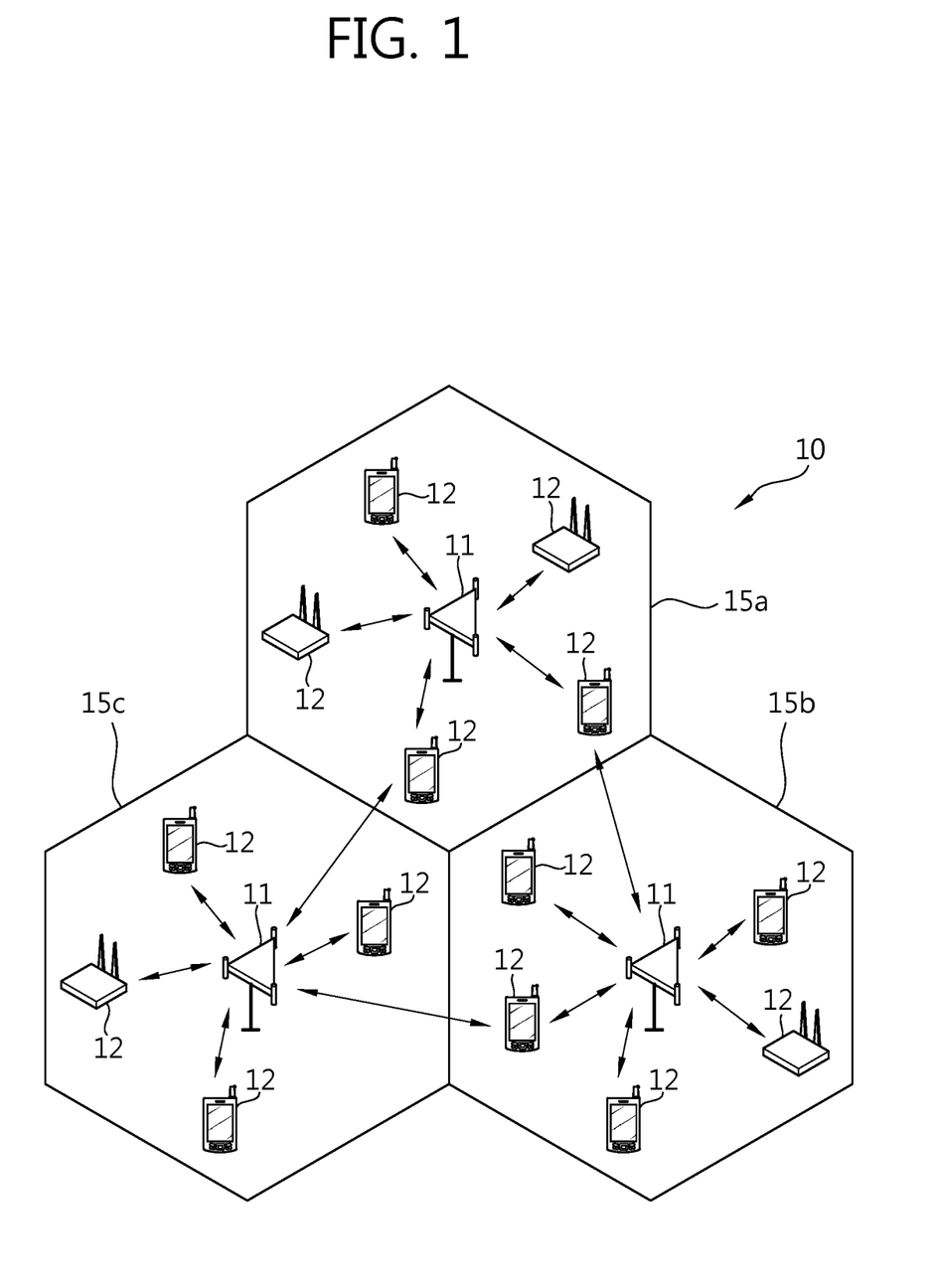
FIG. 1 shows a wireless communication system.

FIG. 1 shows a wireless communication system.

Referring to FIG. 1, a wireless communication system 10 includes at least one base station (BS) 11. Each BS 11 provides a communication service to a specific geographical region 15 which is generally called a cell. The cell can be divided into a plurality of regions, each of which is called a sector. One or more cells may exist in one BS. The BS 11 is generally a fixed station that communicates with a user equipment (UE) 12 and may be referred to as another terminology, such as an evolved node-B (eNB), a base transceiver system (BTS), an access point, an access network (AN), etc.

The UE 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, a downlink (DL) implies communication from the BS 11 to the UE 12, and an uplink (UL) implies communication from the UE 12 to the BS 11.

The wireless communication system 10 may be a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources. The BS 11 and the UE 12 communicate with each other by using a radio resource called a radio frame.

The system of FIG. 1 may be implemented by an LTE system. In this case, a structure of the LTE system may be classified into an evolved UMTS terrestrial radio access network (E-UTRAN) and an evolved packet core (EPC). The E-UTRAN consists of a UE and an evolved NodeB (eNB). An interface between the UE and the eNB may be called a Uu interface. An interface between one eNB and another eNB may be called an X2 interface. The EPC may consist of a mobility management entity (MME) serving for a control-plane function and a serving gateway (S-GW) serving for a user-plane function. Meanwhile, an interface between the eNB and the MME may be called an S1-U interface, and an interface between the eNB and the S-GW may be called an S1-U interface. The two interfaces may be collectively called an S1 interface.

Figure 2:
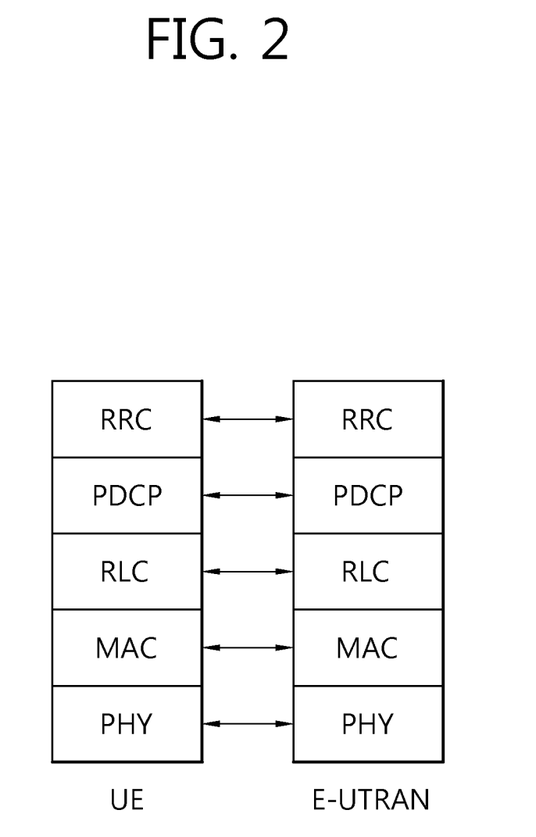
FIG. 2 is a diagram showing a control plane of a radio interface protocol.
Figure 3:
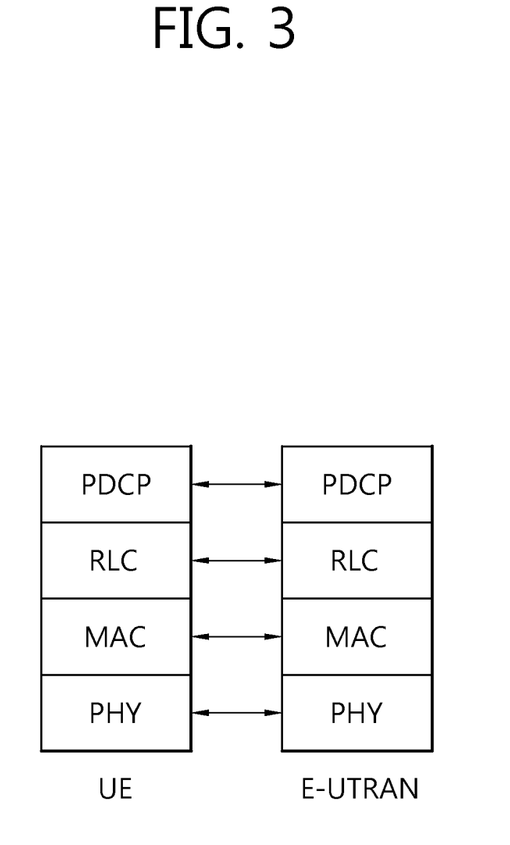
FIG. 3 is a diagram showing a user plane of a radio interface protocol.

A radio interface protocol is defined in the Uu interface which is a radio section. The radio interface protocol horizontally consists of a physical layer, a data link layer, and a network layer, and is vertically divided into a user plane (U-plane) for user data transmission and a control plane (C-plane) for control signal delivery (signaling). On the basis of the three lowest layers of a well-known open system interconnection (OSI) standard model, as shown in FIG. 2 and FIG. 3, the radio interface protocol can be generally divided into a first layer (L1) including a physical (PHY) layer, a second layer (L2) including medium access control (MAC)/radio link control (RLC)/packet data convergence protocol (PDCP) layers, and a third layer (L3) including a radio resource control (RRC) layer. These layers are present in pair in a UE and an E-UTRAN, and serve for data transmission of the Uu interface.

FIG. 2 is a diagram showing a control plane of a radio interface protocol.

FIG. 3 is a diagram showing a user plane of a radio interface protocol.

Respective layers will be described below with reference to FIG. 2 and FIG. 3.

A PHY layer, which is a first layer, provides an information transfer service to a higher layer by using a physical channel. The PHY layer is connected with a higher layer, i.e., a MAC layer, through a transport channel. Data between the MAC layer and the PHY layer is transferred through the transport channel. In this case, the transport channel is roughly divided into a dedicated transport channel and a common transport channel according to whether to share the channel. Further, between different PHY layers, i.e., between a PHY layer of a transmitting side and a PHY layer of a receiving side, data is transferred through a physical channel by using a radio resource.

There are several layers in the second layer. First, a MAC layer serves to map various logical channels to various transport channels, and also serves to perform logical channel multiplexing in which several logical channels are mapped to one transport channel. The MAC layer is connected with a higher layer, i.e., an RLC layer, through a logical channel. According to a type of information to be transmitted, the logical channel is roughly divided into a control channel for transmitting information of the C-plane and a traffic channel for transmitting information of the U-plane.

An RLC layer of the second layer serves to regulate a data size so that the data size is suitable to transmit data by a lower layer to a radio section by segmenting and concatenating data received from a higher layer. In addition, to ensure a variety of quality of service (QoS) required by each radio bearer (RB), the RLC layer provides three operation modes, i.e., a transparent mode (TM), an unacknowledged mode (UM), and an acknowledged mode (AM). In particular, the AM RLC performs a retransmission function by using an automatic repeat request (ARQ) for reliable data transmission.

A PDCP layer of the second layer performs a header compression function for decreasing an Internet protocol (IP) packet header size which is relatively great and which contains unnecessary control information in order to effectively perform transmission in a radio section having a small bandwidth when transmitting an IP packet such as IPv4 or IPv6. This serves to increase transmission efficiency of the radio section by allowing only necessary information to be transmitted in a header part of data. In addition, in the LTE system, the PDCP layer also performs a security function which consists of ciphering for avoiding data interception and integrity protection for avoiding data manipulation of a third party.

An RRC layer located in the uppermost part of the third layer is defined only in the C-plane. The RRC layer serves to control the logical channel, the transport channel, and the physical channel in association with configuration, reconfiguration and release of radio bearers (RBs). Herein, the RB implies a logical path provided by the first and second layers for data delivery between the UE and the UTRAN. In general, the setup of the RB implies a process for specifying a radio protocol layer and channel properties required to provide a particular service and for determining respective detailed parameters and operations. The RB can be classified into two types, i.e., a signaling RB (SRB) and a data RB (DRB). The SRB is used as a path for transmitting an RRC message in the C-plane. The DRB is used as a path for transmitting user data in the U-plane.

Hereinafter, a carrier aggregation of an LTE-A system is described. For clarity, hereinafter, the carrier aggregation is simply called a CA.

An LTE-A technical standard is an IMT-advanced candidate technique of an international telecommunication union (ITU), and is designed to conform to an IMT-advanced technical requirement of the ITU. Accordingly, it is under discussion in LTE-A to extend a bandwidth in comparison with the legacy LTE system in order to satisfy the ITU requirement. To extend the bandwidth in the LTE-A system, a carrier that can be used in the legacy LTE system is defined as a component carrier (hereinafter, CC). It has been discussed that up to 5 CCs can be used until Release-11 (Rel-11). By reference, a serving cell may consist of one downlink CC and one uplink CC. Alternatively, the serving cell may consist of one downlink CC. Since a CC may have a bandwidth of up to 20 MHz as in the LTE system, if 5 CCs are aggregated, the bandwidth can be extended to up to 100 MHz in this concept. A technique of aggregating and using a plurality of CCs is called a CA.

Figure 4:
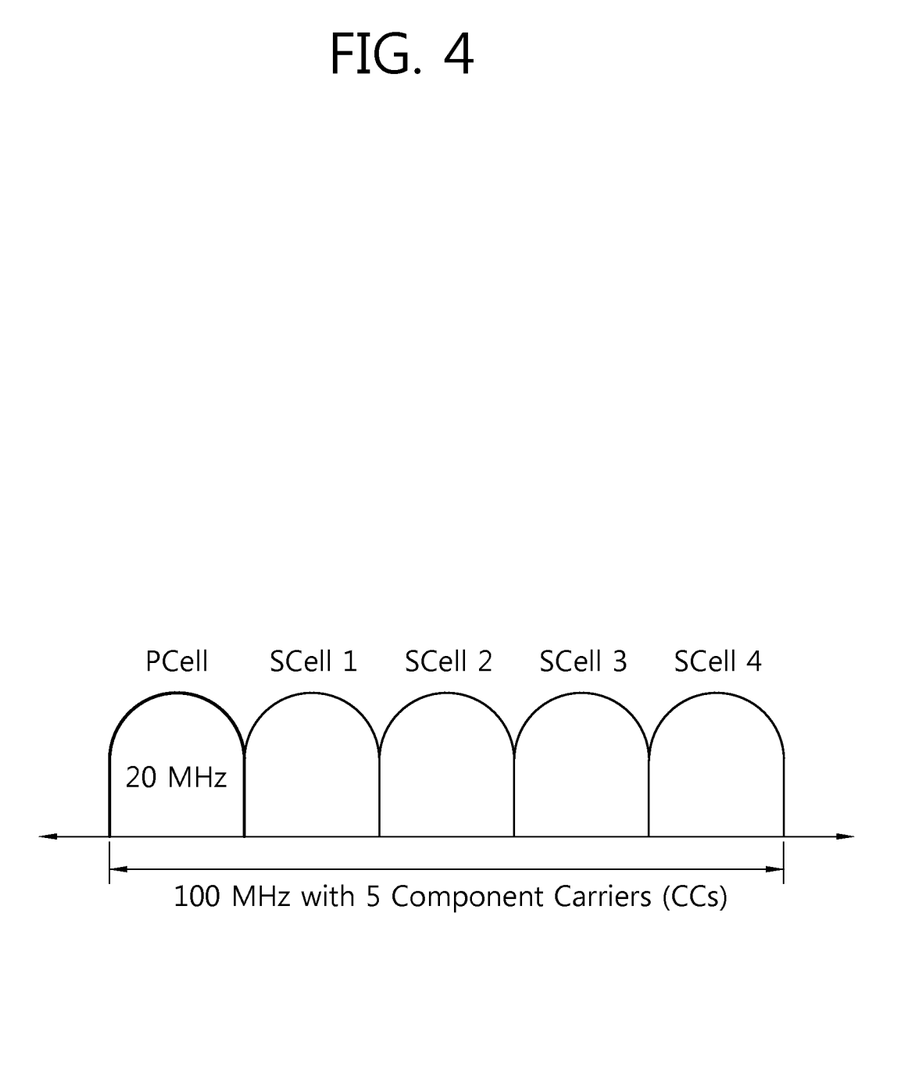
FIG. 4 shows a carrier aggregation (CA) technique that can be applied in a long term evolution-advanced (LTE-A) system.

FIG. 4 shows a CA technique that can be applied in an LTE-A system.

If the CA technique is applied, only one RRC connection exists between a UE and a network. Among a plurality of serving cells configured to be used by the UE, a serving cell which provides a security input (e.g., ECGI, PCI, ARFCN) and mobility information (e.g., TAI) of a non-access-stratum (NAS) to establish or re-establish an RRC connection is called a primary serving cell (PCell), and the other cells are called a secondary serving cell (SCell). In the present specification, the PCell may be called a primary cell, and the SCell may be called a secondary cell.

Figure 5:
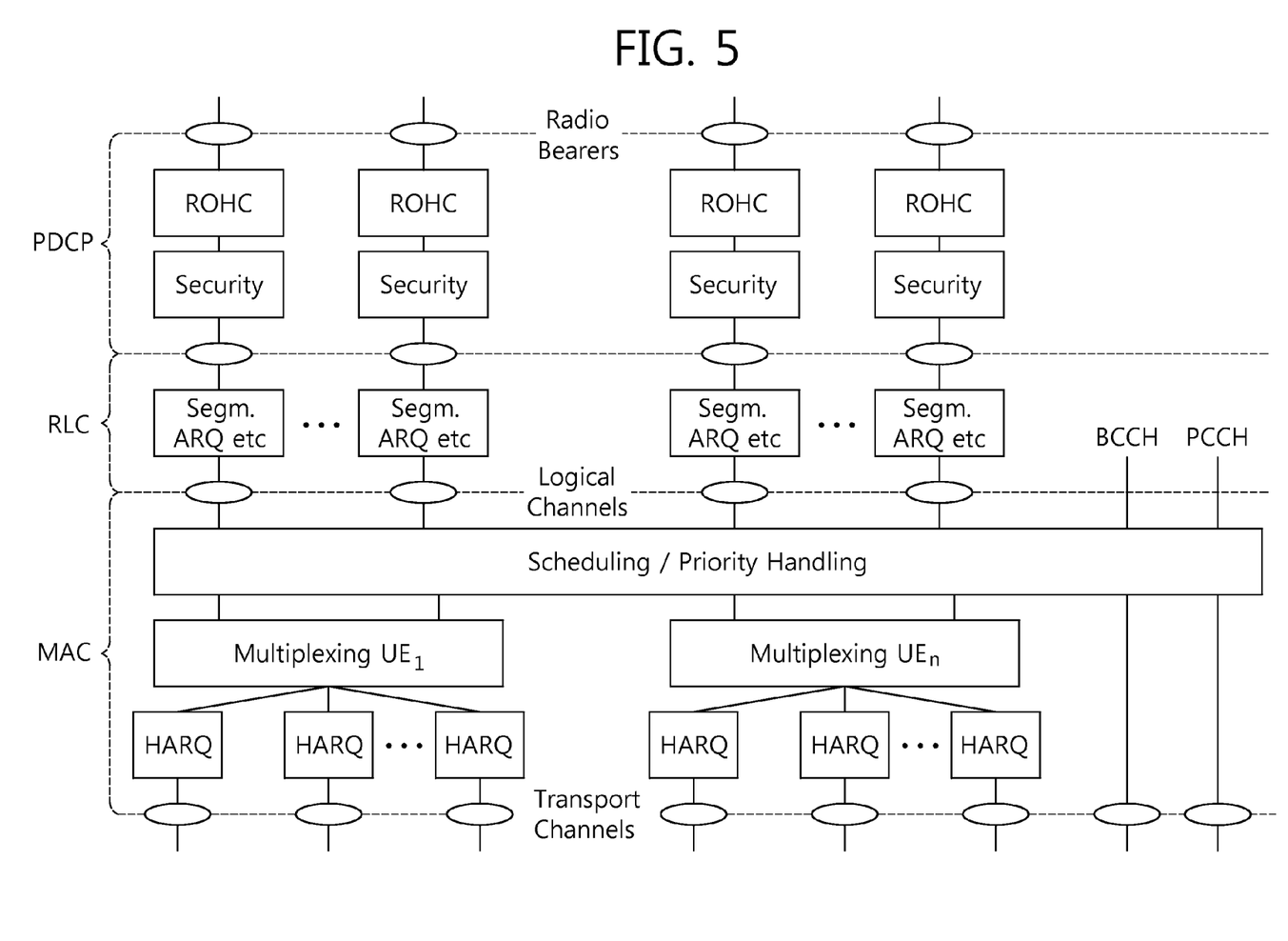
FIG. 5 shows a second downlink layer designed by considering a CA technique.

FIG. 5 shows a second downlink layer designed by considering a CA technique.

Figure 6:
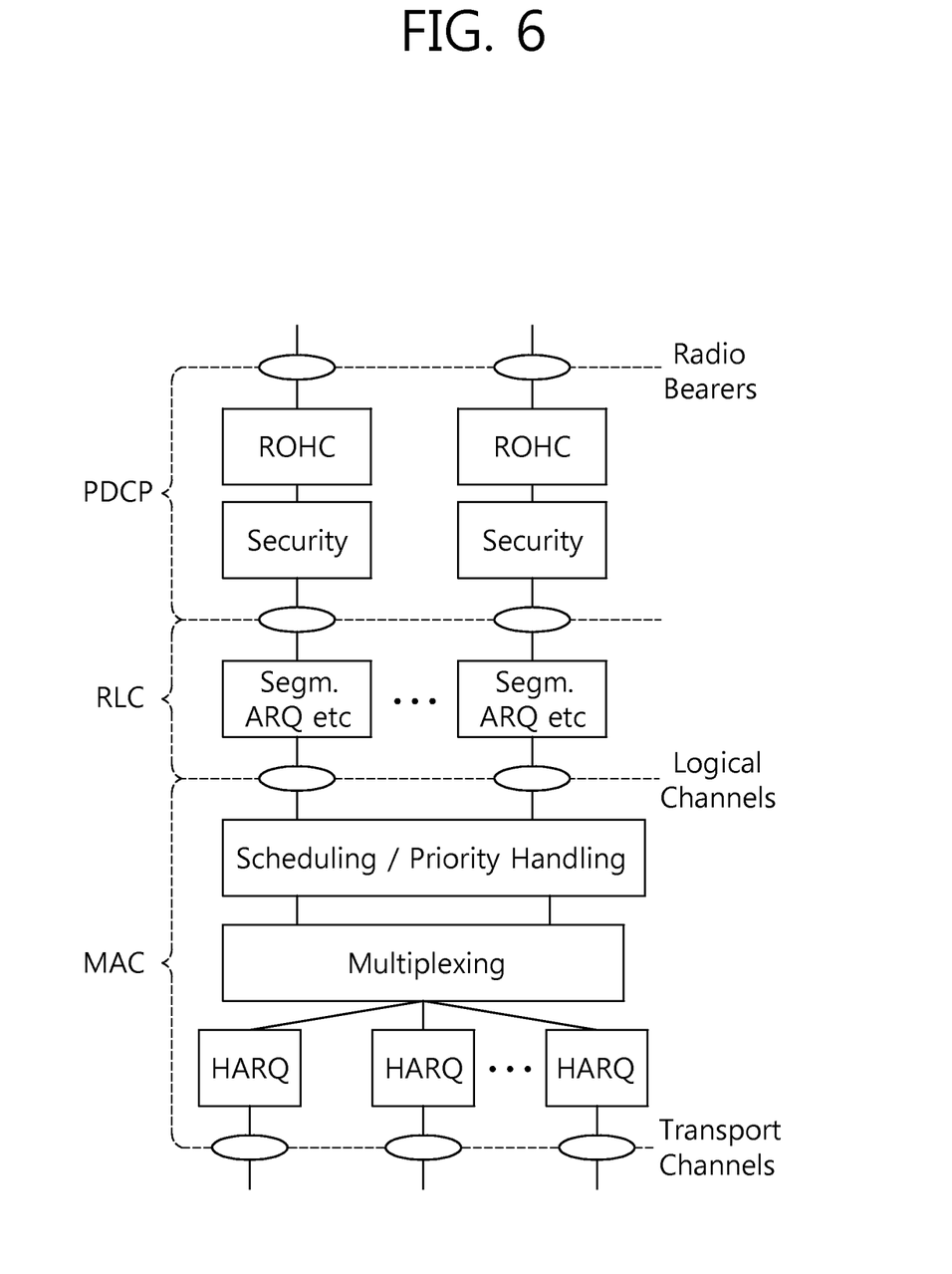
FIG. 6 shows a second uplink layer designed by considering a CA technique.

FIG. 6 shows a second uplink layer designed by considering a CA technique.

The CA technique has a great effect on a MAC layer of a layer 2. For example, since a plurality of CCs are used in the CA and one CC is managed in one HARQ entity, a MAC layer of an LTE-A system must perform operations related to a plurality of HARQ entities. In addition, in the CA, each HARQ entity can transmit or receive a plurality of transport blocks at the same time through the plurality of CCs since the transport blocks are processed independently.

Next, an uplink timing advance/alignment maintenance of an LTE system is described. In the LTE system based on an orthogonal frequency division multiplex (OFDM) technique, a time required for a signal transmitted by a UE to be arrived to an eNB may vary depending on a radius of a cell, a location of the UE in the cell, and a movement speed of the UE. That is, unless the eNB manages uplink transmission timing for each UE, there is a possibility that a transmission signal of one UE acts as an interference to a transmission signal of another UE, which leads to an increase in an error rate of a reception signal in the eNB side.

More specifically, in case of a UE which attempts transmission at a cell boundary, a time required for a transmitted signal to be arrived to the eNB may be longer than an arrival time of a signal transmitted by a UE located in a cell center. On the contrary, an arrival time of transmission of the UE located in the cell center may be relatively shorter than that of transmission of the UE located in the cell boundary. In the eNB side, data or signals transmitted by all UEs in the cell must be received within every valid time boundary to avoid an interference influence. Therefore, the eNB needs to properly adjust transmission timing of the UE according to a UE situation, and such an adjustment is called the timing advance/alignment maintenance.

A random access operation may be used as one method of the timing advance/alignment maintenance. That is, through the random access operation, the eNB receives a random access preamble transmitted by the UE, and calculates a timing advance value for advancing or delaying transmission timing of the UE, by using reception information of the random access preamble. In addition, through the random access response, the calculated timing advance value is reported to the UE, and the UE updates the transmitting timing by using the value. In another method, the eNB receives a sounding reference signal (SRS) transmitted periodically or randomly by the UE, calculates the timing advance value of the UE by using the received signal, and reports the value to the UE. Accordingly, the UE updates its transmission timing.

As described above, the eNB measures the transmitting timing of the UE by using a random access preamble or a sounding reference signal (SRS), and calculates a timing value to be corrected and reports it to the UE. Such a timing advance value transmitted by the eNB to the UE (that is, the timing value to be corrected) is called a timing alignment command (TAC). The TAC is processed in a MAC layer.

In addition, since the UE is not always present only in a fixed location, the transmission timing of the UE changes every time according to a UE's movement speed, location, etc. By considering this aspect, once the UE receives the TAC from the eNB, the UE must assume that the TAC is valid only during a specific time instead of regarding the TAC as being valid during an infinite time. For this, a time alignment timer (TAT) is used.

That is, upon receiving the TAC from the eNB, the UE starts the TAT. In addition, the UE assumes that uplink timing is aligned with the eNB. A value of the TAT may be delivered by using system information or an RRC signal such as a radio bearer reconfiguration. In addition, during the TAT is running, if a new TAC is received from the eNB, the UE restarts the TAT. Further, when the TAT is expired or when the TAT is not running, the UE assumes that timing is not aligned with the eNB, and the UE does not transmit any uplink signal, e.g., a PUSCH and PUCCH signal, other than a random access preamble.

Hereinafter, activation/deactivation of a secondary serving cell (i.e., secondary cell) in a CA technique is described.

When a UE uses a plurality of serving cells by applying the CA technique, an eNB may add or remove a secondary serving cell according to an uplink/downlink traffic situation of the UE. In addition, in order to optimize a signaling overhead for adding or removing the secondary serving cell, the eNB may adjust an activation state of the secondary serving cell, instead of removing the secondary serving cell. When in a deactivation state, the secondary serving cell may have the following feature.

An SRS is not transmitted in the secondary serving cell.
A CQI/PMI/RI/PTI for the secondary serving cell is not transmitted.
Uplink data is not transmitted in the secondary serving cell.
A PDCCH is not monitored in the secondary serving cell.
A PDCCH for the secondary serving cell is not monitored.

For this, the eNB may adjust an activation state of a specific secondary serving cell by transmitting to the UE an activation/deactivation command (more specifically, an activation/deactivation MAC control element) processed in a MAC layer.

Figure 7:
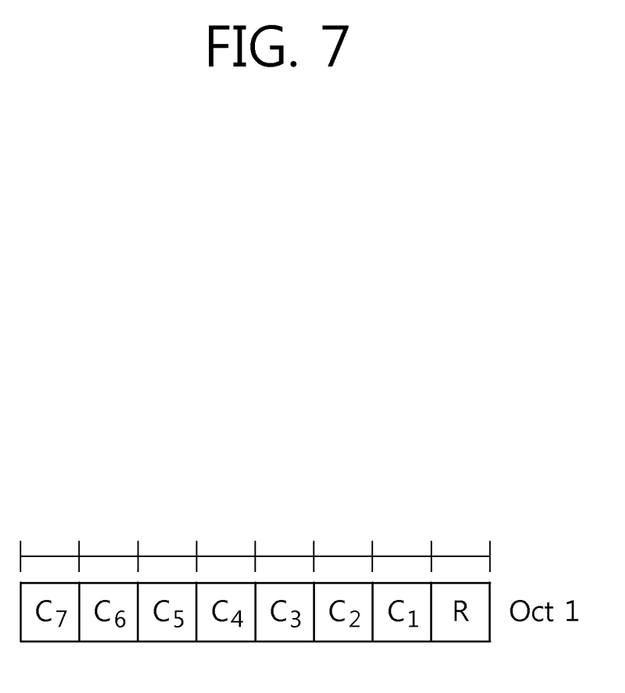
FIG. 7 is a diagram showing a detailed example of an activation/deactivation command for adjusting an activation state of a secondary serving cell.

FIG. 7 is a diagram showing a detailed example of an activation/deactivation command for adjusting an activation state of a secondary serving cell.

In a case where an eNB transmits an activation/deactivation command for deactivating the secondary serving cell, a UE may fail to receive this due to an error on a wireless network. In preparation for this, the UE must assume that the secondary serving cell is in a deactivation state if the secondary serving cell is not used for more than a specific time, instead of maintaining an activation state of the secondary serving cell for an infinite time. A secondary serving cell deactivation timer (sCellDeactivationTimer) is used for this.

The sCellDeactivationTimer runs for each secondary serving cell. The UE starts the sCellDeactivationTimer of the secondary serving cell upon receiving the activation/deactivation command, and restarts the deactivation timer upon receiving the activation/deactivation command for activating the cell or uplink/downlink resource allocation information for the activated secondary serving cell. If the sCellDeactivationTimer is expired or if the UE receives the activation/deactivation command for deactivation, the sCellDeactivationTimer of the cell stops running, and the cell transitions to a deactivation state.

Hereinafter, multiple timing advances in a CA technique is described.

When a UE uses a plurality of serving cells by applying the CA technique, since each serving cell may have a different frequency feature, a maintenance of multiple timing advances is necessary. When uplink transmission is attempted in a situation where transmission timing is not aligned among a plurality of serving cells, an inter-cell interference occurs. Similarly to an LTE system in which a timing advance maintenance is achieved for each user to decrease an interference between users, the CA technique reduces the inter-cell interference by properly adjusting uplink transmission timing of each serving cell having an uplink CC.

If the UE uses the plurality of serving cells, serving cells having a similar feature in terms of a timing advance change may exist among them according to a frequency feature. For example, serving cells in the same frequency band may show the similar feature in terms of the timing advance change. In the CA technique, in order to optimize multiple uplink timing advances, the serving cells having the similar feature in terms of the timing advance change are grouped, and this group is called a timing advance group (TAG). An eNB reports to the UE about information indicating to which TAG each serving cell belongs by using a TAG indicator of an RRC signal. One UE may have at least two or more TAGs, and a plurality of serving cells having a similar feature in terms of an uplink timing advance change may exist in one TAG. Among the plurality of serving cells in one TAG, at least one serving cell must have an uplink.

As described above, if a TAC is received from the eNB, the UE starts a TAT, and it is assumed that timing is aligned between the UE and the eNB only when the TAT is running. The UE which uses the CA technique achieves the timing advance maintenance for each TAG, and thus the TAT runs for each TAG. That is, the same timing advance change amount is applied to all serving cells in the same TAG, and if the TAT is expired, any uplink transmission is impossible through a serving cell of a corresponding TAG other than a preamble for a random access.

Figure 8:
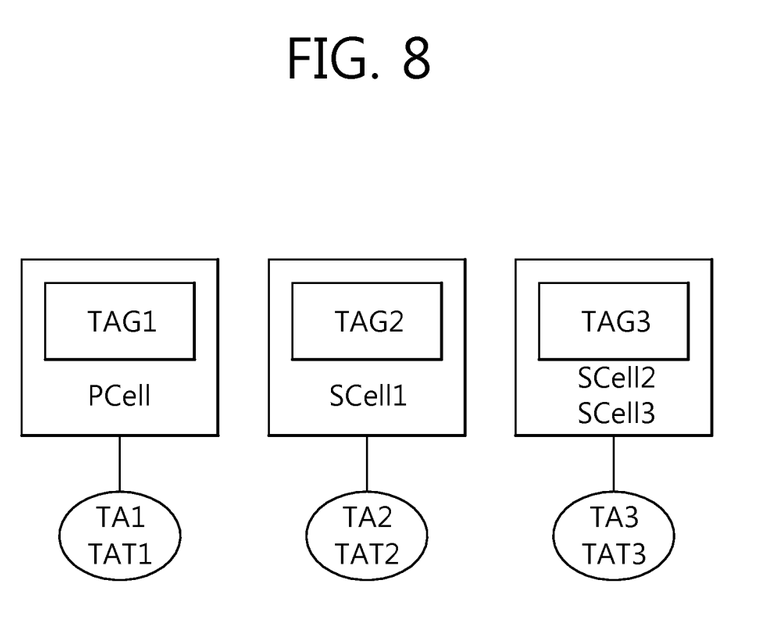
FIG. 8 shows an example of configuring a timing advance group (TAG) according to various types of cells.

FIG. 8 shows an example of configuring a TAG according to various types of cells.

A UE which uses a CA function by configuring a plurality of serving cells may conform to the following principle when adjusting an uplink timing advance.

A TAT value may differ for each TAG.

A TAG including a primary cell is called a primary TAG (pTAG), and a TAG not including the primary cell but consisting of only a secondary cell is called a secondary TAG (sTAG).

When an initial time advance is adjusted on a secondary serving cell belonging to the sTAG, a corresponding serving cell may start a random access process only by an order of an eNB. Even if uplink transmission is required, the random access process cannot start without the order of the eNB.

When a TAT of the sTAG is expired or does not run, it is assumed that serving cells in the sTAG are not time-aligned with the eNB.

When a TAT of a pTAG is expired or does not run, a TAT of another TAG cannot run, either. That is, it is assumed that all serving cells are not time-aligned with the eNB.

The UE selects any cell from activated serving cells in the sTAG and assumes the cell as a timing reference serving cell. The timing reference serving cell may also be called a timing reference cell.

The timing reference serving cell (i.e., the timing reference cell) is time-aligned in an uplink through a random access.

The eNB may activate/deactivate the secondary serving cell added to the UE according to traffic. When the secondary serving cell in the sTAG is activated, the UE starts/restarts a sCellDeactivationTimer of the secondary serving cell. Thereafter, if a timer (i.e., a deactivation timer) is expired or an activation/deactivation command for deactivating the secondary serving cell is received, the secondary serving cell transitions to a deactivation state. In this case, there is a case where the secondary serving cell unexpectedly transitions to the deactivation state. For example, if the timer is expired unexpectedly due to erroneous decoding or the like of the activation/deactivation command, the secondary serving cell transitions to the deactivation state.

When it is said that the timing reference serving cell (i.e., the timing reference cell) transitions to the deactivation state, it means that a timing advance change amount applied to all secondary serving cells in a corresponding sTAG is no longer valid. When uplink data transmission is attempted in the secondary serving cell in the sTAG, it may cause an interference to other serving cells. Therefore, it is required a mechanism in which the timing reference serving cell maintains an activation state so that the valid timing advance change amount is applied to the secondary serving cell in the sTAG.

Accordingly, the present specification proposes a method and apparatus for maintaining an activation state of a specific serving cell in a TAG. Specifically, it is provided a scheme for deciding whether uplink timing of the TAG is required to be maintained, and determining whether a deactivation timer for a cell is restarted according to a result thereof. More specifically, according to whether the uplink timing is required to be maintained, it is determined whether a deactivation timer of another cell included in the same TAG is running. For example, even if it is a time of expiring a deactivation timer for a $1^{st}$ cell, if a deactivation timer of a $2^{nd}$ cell included in the same TAG is running, the deactivation timer of the $1^{st}$ cell may be restarted. Accordingly, the $1^{st}$ cell may not enter the deactivation state. That is, an activation state of the $1^{st}$ cell is maintained. The $1^{st}$ cell may be a timing reference cell.

In other words, the present specification proposes a method and apparatus in which an eNB configures a TAG to a UE, and if a serving cell is added to the TAG, the UE maintains an activation state of a specific serving cell in the TAG. That is, if it is determined that an uplink timing advance of the TAG is required to be maintained when a secondary serving cell deactivation timer of a timing reference cell is expired, the UE restarts the secondary serving cell deactivation timer of the timing reference cell. Meanwhile, as described above, the deactivation timer may be referred to as a "sCellDeactivation Timer" or the like.

The TAG may be a secondary serving cell, that is, a secondary TAG (sTAG) consisting of only a secondary cell. In addition, a serving cell added, deleted, or modified in the sTAG may be a secondary serving cell, that is, a secondary cell. As described above, the $1^{st}$ cell may be a timing reference cell. The timing reference cell according to the present specification may be determined according to the following criterion.

- For example, a secondary cell designated by the eNB as the timing reference cell of the sTAG may be a timing reference cell.
- Additionally or alternatively, a secondary cell to which an RACH configuration is configured by the eNB may be configured as the timing reference cell. The RACH configuration is delivered from the eNB to the UE, and may be included in system information such as SIB2 and the like. The RACH configuration may include resource information or the like for performing a random access performed by the UE at a later time.
- Alternatively, a secondary cell to which an RACH configuration is configured by the eNB and of which a random access process is successfully complete may be configured as the timing reference cell. For example, a secondary cell of which a random access attempted most recently is successfully complete may be the timing reference cell.

As described above, the present specification proposes a scheme for restarting a deactivation timer of a $1^{st}$ cell to maintain an activation state of the $1^{st}$ cell included in a TAG. More specifically, the deactivation timer of the $1^{st}$ cell is preferably restarted when it is determined that an uplink timing advance of the TAG is required to be maintained.

For this, a criterion by which a UE determines that an uplink timing advance, i.e., uplink timing, of the TAG is required to be maintained is proposed in order to restart a timer when a deactivation timer of a timing reference cell is expired. For example, the following operation is performed in a case where the TAG is a sTAG, $1^{st}$ and $2^{nd}$ cells are included in the sTAG, and the $1^{st}$ cell is a timing reference cell.

Specifically, when the deactivation timer of the timing reference cell (e.g., the $1^{st}$ cell) in a sTAG is expired, if a deactivation timer of one or more secondary cells (e.g., the $2^{nd}$ cell) in the sTAG is running, the UE may determine that an uplink timing advance is required to be maintained. In this case, the UE restarts a secondary cell deactivation timer of the timing reference cell of the sTAG, and is allowed to maintain an activation state.

If another secondary cell deactivation timer (e.g., a deactivation timer of the $2^{nd}$ cell) which is running in a corresponding sTAG is not present when the deactivation timer of the timing reference cell (e.g., the deactivation timer of the $1^{st}$ cell) is expired, the UE may determine that it is not required to maintain the uplink timing advance of the sTAG, and may allow the timing reference cell to transition to a deactivation state.

Figure 9:
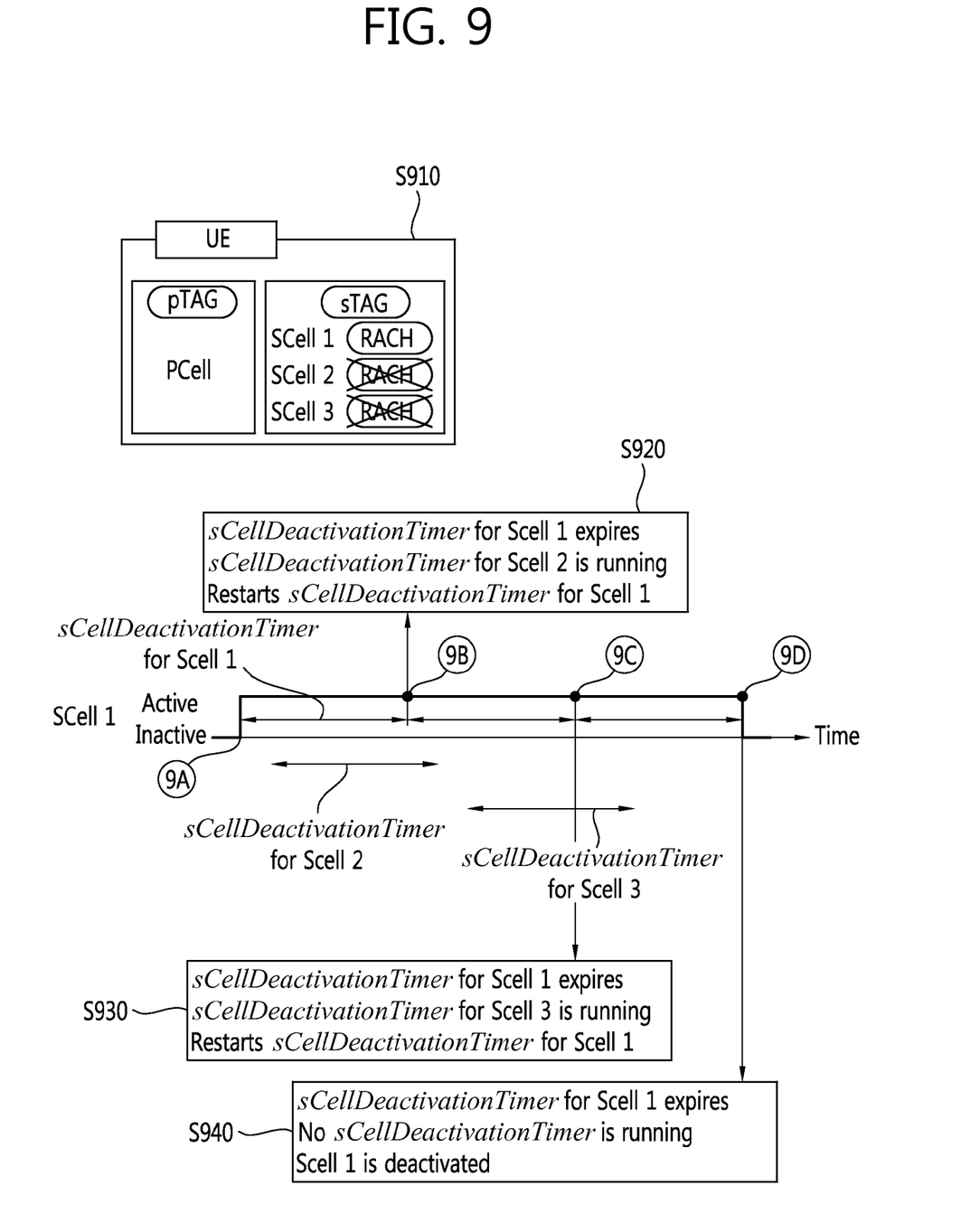
FIG. 9 shows an example according to the present invention.

FIG. 9 shows an example according to the present invention.

An operation based on step S910 is as follows.

A UE may include at least two TAGs. Among them, a TAG1 may be a pTAG, and a TAG2 may be a sTAG. In addition, the UE may configure $1^{st}$, $2^{nd}$, and $3^{rd}$ cells belonging to the same TAG. The $1^{st}$ to $3^{rd}$ cells may be cells included in the sTAG, i.e., a SCell1 to a SCell 3.

In this case, as illustrated, an eNB may configure an RACH configuration only to the SCell 1 among the secondary cells of the TAG2. In this case, as illustrated, if a timing reference cell is defined according to the RACH configuration, the SCell 1 is a timing reference cell in the TAG2.

At a time indicated by 9A, the $1^{st}$ cell may transition to an activation state. In this case, a deactivation timer is running for the SCell 1.

An operation based on step S920 is as follows.

At a time indicated by 9B, the secondary cell deactivation timer of the SCell 1 may be expired.

In this case, the UE may check whether an uplink timing advance of the TAG2 to which the SCell 1 belongs, that is, uplink timing, is maintained. That is, according to the above description, at the time indicated by 9B, it is determined whether a deactivation timer of the SCell2 belonging to the TAG2 is running. In case of FIG. 9, since the deactivation timer of the SCell 2 is running, it is determined that the uplink timing advance of the TAG2 is required to be maintained.

Accordingly, the UE may restart the deactivation timer of the SCell 1.

An operation based on step S930 is as follows.

At a time indicated by 9C, the deactivation timer of the SCell 1 may be expired. In this case, the UE checks whether a timer of another secondary cell within the TAG2 to which the SCell 1 belongs is running. In this case, as illustrated, since a deactivation timer of the SCell3 is running, the UE may determine that an uplink timing advance of the TAG2 is required to be maintained.

Accordingly, the UE may restart the secondary cell deactivation timer of the SCell 1.

An operation based on step S940 is as follows.

At a time indicated by 9D, the deactivation timer of the SCell 1 may be expired. In this case, the UE checks whether a secondary cell deactivation timer of another secondary cell in the TAG2 to which the SCell 1 belongs is running. As illustrated, since deactivation timers of the SCell 2 and the SCell3 have already been expired, there is no secondary deactivation timer which is running. Therefore, it is determined that it is not required to maintain the uplink timing advance of the TAG2.

Accordingly, the UE may allow the SCell 1 of which the secondary cell deactivation timer is expired to transition to a deactivation state.

According to one example of the present specification, if it is determined that it is not required to maintain an activation state of a timing reference cell when a secondary cell deactivation timer of the timing reference cell in one sTAG is expired, a UE restarts the secondary cell deactivation timer of the timing reference cell, and thus there is an advantage in that the activation state of the timing reference cell is maintained and an uplink timing advance in the sTAG is maintained.

Figure 10:
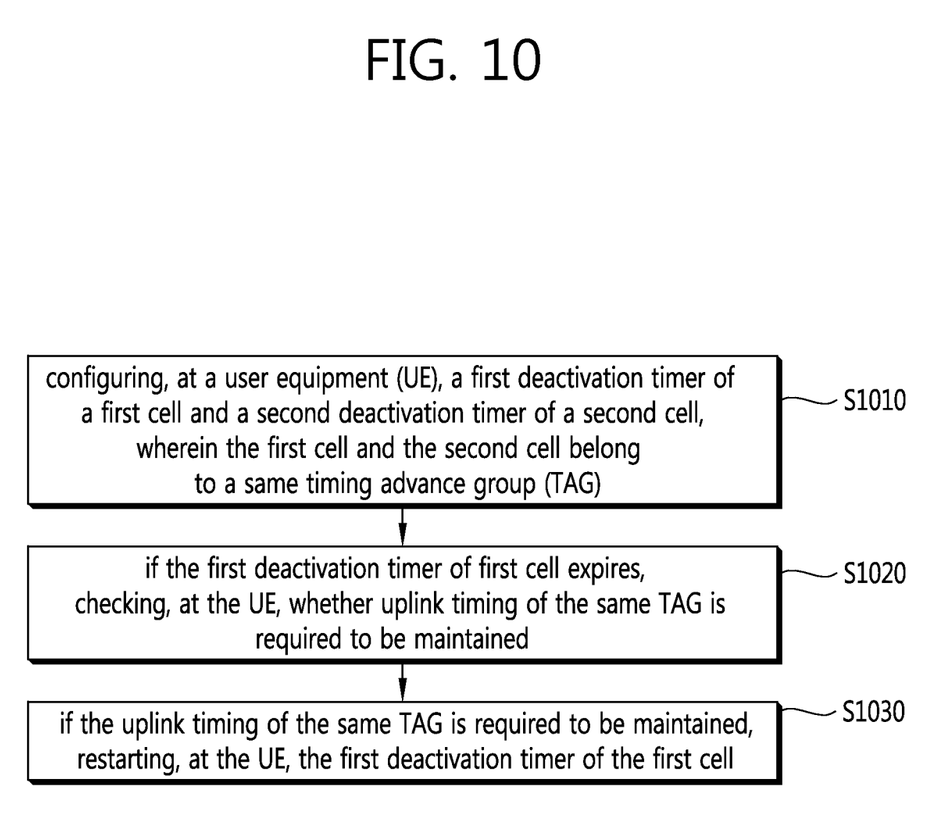
FIG. 10 is a flowchart for explaining a method according to the present specification.

FIG. 10 is a flowchart for explaining a method according to the present specification. The method of FIG. 10 relates to a method of controlling a deactivation timer of a cell in a mobile communication system.

As shown in step S1010, a UE configures a $1^{st}$ deactivation timer of a $1^{st}$ cell and a $2^{nd}$ deactivation timer of a $2^{nd}$ cell. In this case, the $1^{st}$ cell and the $2^{nd}$ cell belong to the same TAG. Meanwhile, the $1^{st}$ cell and the $2^{nd}$ cell may be determined as a secondary cell, and the UE may additionally configure a primary cell. The aforementioned same TAG may be a secondary TAG.

The $1^{st}$ cell may be a timing reference cell of the same TAG. In this case, the timing reference cell may be a cell of which an RACH configuration is provided by an eNB. Alternatively, the timing reference cell may be a cell of which a random access is successfully complete.

Meanwhile, a timer value indicating a time duration in which a deactivation timer of a secondary cell is running may be commonly applied to the $1^{st}$ deactivation timer of the $1^{st}$ cell and the $2^{nd}$ deactivation timer of the $2^{nd}$ cell.

As illustrated in step S1020, if the $1^{st}$ deactivation timer of the $1^{st}$ cell is expired, the UE checks whether uplink timing of the same TAG is required to be maintained. Preferably, the step of checking whether the uplink timing of the same TAG is required to be maintained is implemented by checking whether the $2^{nd}$ deactivation timer of the $2^{nd}$ cell is running. More specifically, if the $2^{nd}$ deactivation timer of the $2^{nd}$ cell is running when the $1^{st}$ deactivation timer of the $1^{st}$ cell is expired, the $1^{st}$ deactivation timer of the $1^{st}$ cell is restarted.

As illustrated in step S1030, if the uplink timing of the same TAG is required to be maintained, the $1^{st}$ deactivation timer of the $1^{st}$ cell is restarted by the UE. If it is not required to maintain the uplink timing of the same TAG, the $1^{st}$ cell is deactivated.

Figure 11:
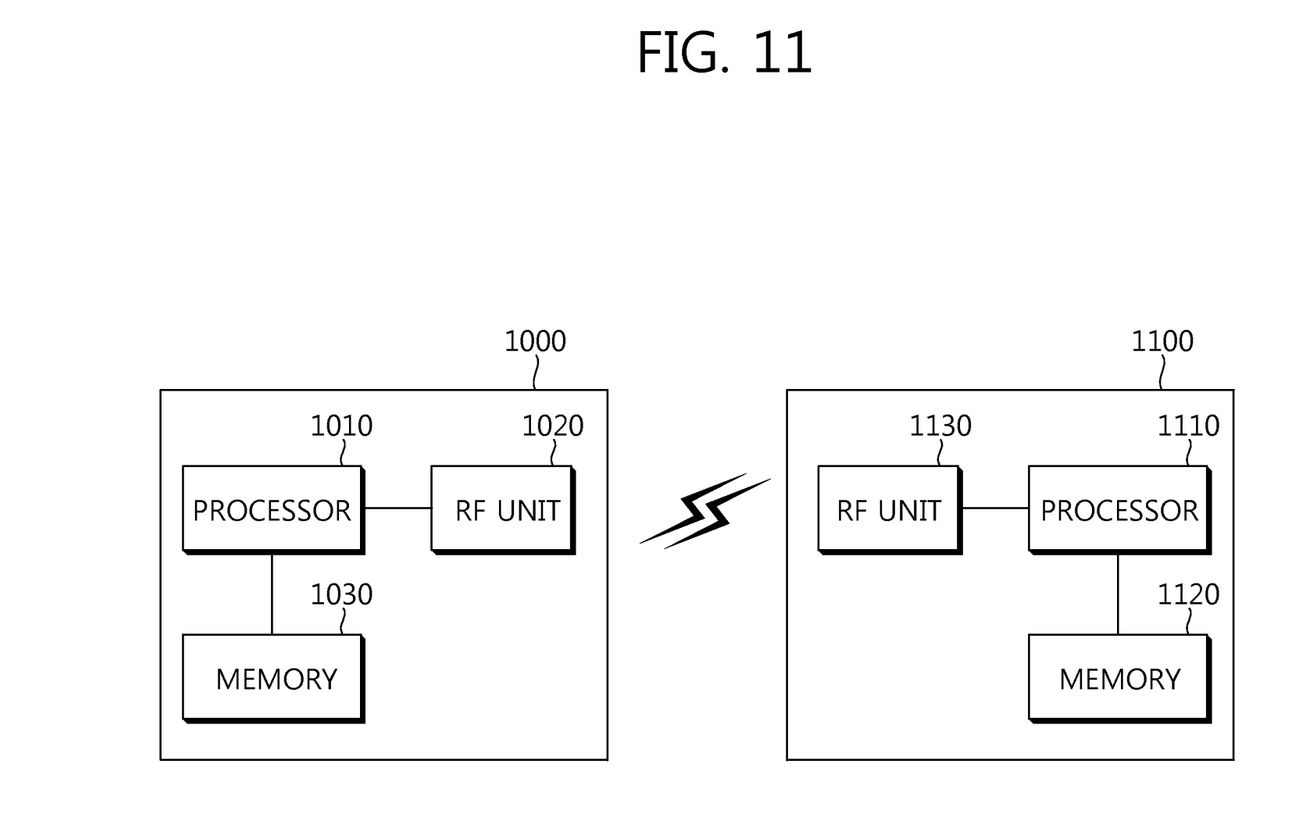
FIG. 11 shows an example of an apparatus to which the aforementioned scheme is applied.

FIG. 11 shows an example of an apparatus to which the aforementioned scheme is applied. The aforementioned scheme may be implemented by a UE 1000 as an apparatus for transmitting control information through an uplink. The UE 1000 may communicate with an eNB 1100.

The UE 1000 includes a processor 1010, a memory 1030, and a radio frequency (RF) unit 1020. The processor 1010 may allocate a radio resource according to externally provided information, internally pre-stored information, etc. The processor 1010 may implement procedures, methods, and functions performed by the UE in the aforementioned embodiments. The memory 1030 is coupled to the processor 1010, and stores a variety of information for driving the processor 1010. The RF unit 1020 is coupled to the processor 1010, and transmits and/or receives a radio signal.

The eNB 1100 which communicates with the UE includes a processor 1110, a memory 1120, and an RF unit 1130. The processor 1110 may implement procedures, methods, and functions performed by the eNB in the aforementioned embodiments. The memory 1120 is coupled to the processor 1110, and stores a variety of information for driving the processor 1110. The RF unit 1130 is coupled to the processor 1110, and transmits and/or receives a radio signal.

The processors 1010 and 1110 may include an application-specific integrated circuit (ASIC), a separate chipset, a logic circuit, and/or a data processing unit. The memories 1030 and 1120 may include a read-only memory (ROM), a random access memory (RAM), a flash memory, a memory card, a storage medium, and/or other equivalent storage devices. The RF units 1020 and 1130 may include a baseband circuit for processing a radio signal. When the embodiment is implemented in software, the aforementioned methods can be implemented with a module (i.e., process, function, etc.) for performing the aforementioned functions. The module may be stored in the memories 1030 and 1120 and may be performed by the processors 1010 and 1110. The memories 1030 and 1120 may be located inside or outside the processors 1010 and 1110, and may be coupled to the processors 1010 and 1110 by using various well-known means.

The aforementioned method and apparatus can be implemented with hardware, software, or combination thereof. In hardware implementation, it can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, it can be implemented with a module for performing the aforementioned functions. Software is storable in a memory unit and executed by the processor. Various means widely known to those skilled in the art can be used as the memory unit or the processor.

What is claimed is:

1. A method of controlling a deactivation timer of a cell in a mobile communication system, the method comprising:
configuring, at a user equipment (UE), a first deactivation timer of a first cell and a second deactivation timer of a second cell, wherein the first cell and the second cell belong to a same timing advance group (TAG);
if the first deactivation timer of the first cell expires, checking, at the UE, whether uplink timing of the same TAG is required to be maintained by checking whether the second deactivation timer of the second cell is running; and
if the uplink timing of the same TAG is required to be maintained, restarting, at the UE, the first deactivation timer of the first cell,
wherein the first deactivation timer of the first cell is restarted if the second deactivation timer of the second cell is running when the first deactivation timer of the first cell expires.

2. The method of claim 1, wherein the UE further configures a primary cell.

3. The method of claim 2, wherein the first cell and the second cell are secondary cells, and wherein the same TAG is a secondary TAG.

4. The method of claim 1, wherein the first cell is a timing reference cell of the same TAG.

5. The method of claim 4, wherein the timing reference cell is a cell for which random access channel (RACH) configuration is provided by a base station.

6. The method of claim 4, wherein the timing reference cell is a cell on which random access procedure is successfully completed.

7. The method of claim 1, wherein a timer value indicating time duration during which a deactivation timer of a secondary cell is running is commonly applied to the first deactivation timer of the first cell and the second deactivation timer of the second cell.

8. The method of claim 1, further comprising:
if the uplink timing of the same TAG is not required to be maintained, deactivating the first cell.

9. A user equipment (UE) for controlling a deactivation timer of a cell in a mobile communication system, the UE comprising:

a transceiver that receives and/or transmits a signal; and
a processor, coupled to the transceiver, that:
configures a first deactivation timer of a first cell and a second deactivation timer of a second cell, wherein the first cell and the second cell belong to a same timing advance group (TAG);
if the first deactivation timer of the first cell expires, checks whether uplink timing of the same TAG is required to be maintained by checking whether the second deactivation timer of the second cell is running; and
if the uplink timing of the same TAG is required to be maintained, restarts the first deactivation timer of the first cell,
wherein the first deactivation timer of the first cell is restarted if the second deactivation timer of the second cell is running when the first deactivation timer of the first cell expires.

\* \* \* \* \*